(12) United States Patent
Hayashi

(10) Patent No.: US 11,310,394 B2
(45) Date of Patent: Apr. 19, 2022

(54) IMAGE FORMING APPARATUS, IMAGE FORMING METHOD, AND COMPUTER-READABLE NON-TRANSITORY RECORDING MEDIUM STORING IMAGE FORMING PROGRAM, FOR PERFORMING COLOR CAILIBRATION BY USING REFERENCE

(71) Applicant: KYOCERA Document Solutions Inc., Osaka (JP)

(72) Inventor: Kenichi Hayashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/105,701

(22) Filed: Nov. 27, 2020

(65) Prior Publication Data

US 2021/0160400 A1     May 27, 2021

(30) Foreign Application Priority Data

Nov. 27, 2019  (JP) .............................. JP2019-214485

(51) Int. Cl.
*H04N 1/60*       (2006.01)
*H04N 1/00*       (2006.01)

(52) U.S. Cl.
CPC ........... *H04N 1/60* (2013.01); *H04N 1/00045* (2013.01); *H04N 1/00087* (2013.01)

(58) Field of Classification Search
None
See application file for complete search history.

(56) References Cited

FOREIGN PATENT DOCUMENTS

JP       2017-195522       10/2017

*Primary Examiner* — Barbara D Reinier
(74) *Attorney, Agent, or Firm* — Lex IP Meister, PLLC

(57) ABSTRACT

An image forming apparatus can perform color calibration by using a reference document generated with use of ink and an external colorimeter. An image reading unit reads an image on a document and generates image data. An image forming unit forms an image on an image forming medium by using CMY toners. A color calibration processing unit sets a correction coefficient by using a spectral reflectance of the reference document in a visible band, and a spectral reflectance in the visible band of a toner image formed on the image forming medium with use of toner. The color calibration processing unit also performs correction by multiplying the correction coefficient with a gradation value of each of RGB, generates a conversion formula from the each gradation value of RGB to each device-independent value, and generates a color profile by using the conversion formula.

6 Claims, 7 Drawing Sheets

INK DOCUMENT (STEP S100)

C   M   Y   K

SPECTRAL REFLECTANCE CALCULATION PROCESSING
(STEP S300)

$$SRtoner\lambda = (a1, a2, a3) \times \begin{pmatrix} Xink^2 \\ Yink^2 \\ Zink^2 \end{pmatrix}$$

$$+ (b1, b2, b3) \times \begin{pmatrix} Xink \\ Yink \\ Zink \end{pmatrix}$$

$$+ C \quad \cdots \cdots \cdots F1$$

FIG. 5A

LIGHT RECEIVING INTENSITY CALCULATION PROCESSING FOR EACH WAVELENGTH (STEP S400)

$$RLItoner\lambda = SRtoner\lambda \times STr\lambda \quad \cdots F2r$$

$$GLItoner\lambda = SRtoner\lambda \times STg\lambda \quad \cdots F2g$$

$$BLItoner\lambda = SRtoner\lambda \times STb\lambda \quad \cdots F2b$$

FIG. 5B

LIGHT RECEIVING INTENSITY CALCULATION PROCESSING IN VISIBLE BAND (STEP S400)

$$RLItoner\_sum = \sum_{\lambda=400}^{730} RLItoner\lambda \quad \cdots F3r$$

$$GLItoner\_sum = \sum_{\lambda=400}^{730} GLItoner\lambda \quad \cdots F3g$$

$$BLItoner\_sum = \sum_{\lambda=400}^{730} BLItoner\lambda \quad \cdots F3b$$

FIG. 5C

RGB INTERNAL CALCULATION PROCESSING (STEP S500)

$$R\_toner = Dr \times RLItoner\_sum^2 + Er \times RLItoner\_sum + Fr \quad \cdots F4r$$

$$G\_toner = Dg \times GLItoner\_sum^2 + Eg \times GLItoner\_sum + Fg \quad \cdots F4g$$

$$B\_toner = Db \times BLItoner\_sum^2 + Eb \times BLItoner\_sum + Fb \quad \cdots F4b$$

FIG. 6A
LIGHT RECEIVING INTENSITY CALCULATION PROCESSING FOR EACH WAVELENGTH (STEP S400)

$RLink\lambda = SRink\lambda \times STr \cdots F5r$ $GLink\lambda = SRink\lambda \times STg \cdots F5g$ $BLink\lambda = SRink\lambda \times STb \cdots F5b$

FIG. 6B
LIGHT RECEIVING INTENSITY CALCULATION PROCESSING IN VISIBLE BAND (STEP S400)

$RLink\_sum = \sum_{\lambda=400}^{730} RLink\lambda \cdots F6r$ $GLink\_sum = \sum_{\lambda=400}^{730} GLink\lambda \cdots F6g$ $BLink\_sum = \sum_{\lambda=400}^{730} BLink\lambda \cdots F6b$

FIG. 6C
RGB INTERNAL CALCULATION PROCESSING (STEP S500)

$R\_ink = Hr \times RLink\_sum^2 + Jr \times RLink\_sum + Nr \cdots F7r$ $G\_ink = Hg \times GLink\_sum^2 + Jg \times GLink\_sum + Ng \cdots F7g$ $B\_ink = Hb \times BLink\_sum^2 + Jb \times BLink\_sum + Nb \cdots F7b$

FIG. 6D
CORRECTION MAGNIFICATION CALCULATION PROCESSING (STEP S600)

$\gamma r = \dfrac{R\_toner}{R\_ink} \cdots F8r$ $\gamma g = \dfrac{G\_toner}{G\_ink} \cdots F8g$ $\gamma b = \dfrac{B\_toner}{B\_ink} \cdots F8b$

SPECTRAL REFLECTANCE ACCORDING TO DENSITY LEVEL 4

SPECTRAL REFLECTANCE OF TONER AND INK

IMAGE FORMING APPARATUS, IMAGE FORMING METHOD, AND COMPUTER-READABLE NON-TRANSITORY RECORDING MEDIUM STORING IMAGE FORMING PROGRAM, FOR PERFORMING COLOR CAILIBRATION BY USING REFERENCE

INCORPORATION BY REFERENCE

This application is based upon, and claims the benefit of priority from, corresponding Japanese Patent Application No. 2019-214485 filed in the Japan Patent Office on Nov. 27, 2019, the entire contents of which are incorporated herein by reference.

BACKGROUND

Field of the Invention

The present disclosure relates to an image forming apparatus, an image forming method, and a computer-readable non-transitory recording medium storing an image forming program, and particularly relates to a color calibration technique.

Description of Related Art

In recent years, there has been an increasing need for high-quality color printing in image forming apparatus. In order to achieve such image reproduction, it is also necessary to perform calibration processing including color profile adjustment, as necessary, in order to suppress aging change of an image forming apparatus and variations among individuals, specifically, color fluctuations resulting from individual differences and the like. The individual differences are also caused by variations in the chromaticity of a light source of an image reading unit and variations in the layer thickness of a color filter. Such individual differences in the image reading unit also have an adverse effect on color calibration to be performed by using the image reading unit.

SUMMARY

The present disclosure is directed to an image forming apparatus capable of performing color calibration by using a reference document generated with use of a plurality of inks including CMY inks as a color material, and an external colorimeter. The image forming apparatus includes an image reading unit, an image forming unit, and a color calibration processing unit. The image reading unit reads an image on a document and generates image data. The image forming unit forms an image on an image forming medium by using a plurality of toners, including CMY toners, as a color material. The color calibration processing unit sets a correction coefficient for bringing a color of the reference document and a color of a toner image close to each other by using a spectral reflectance of the reference document in a visible band and a spectral reflectance in the visible band of the toner image formed on the image forming medium with use of the toner. The color calibration processing unit also performs correction by multiplying the correction coefficient with a gradation value of each of RGB, acquired by reading the reference document by the image reading unit; generates a conversion formula from the each acquired gradation value of RGB to each device-independent value by using the each corrected gradation value of RGB, and the each device-independent value acquired by measuring the reference document with use of the external colorimeter; and generates a color profile by using the conversion formula.

The present disclosure provides an image forming method capable of performing color calibration by using a reference document generated with use of a plurality of inks including CMY inks as a color material, and an external colorimeter. The image forming method includes an image reading step, an image forming step, and a color calibration step. The image forming step includes reading an image on a document and generating image data. The image forming step includes forming an image on an image forming medium by using a plurality of toners including CMY toners as a color material. The color calibration step includes setting a correction coefficient for bringing a color of the reference document and a color of a toner image close to each other by using a spectral reflectance of the reference document in a visible band, and a spectral reflectance in the visible band of the toner image formed on the image forming medium with use of the toner. The color calibration step also includes performing correction by multiplying the correction coefficient with a gradation value of each of RGB acquired by reading the reference document in the image reading step, generating a conversion formula from the each acquired gradation value of RGB to each device-independent value with use of the each corrected gradation value of RGB, and the each device-independent value acquired by measuring the reference document with use of the external colorimeter, and generating a color profile by using the conversion formula.

The present disclosure provides a computer-readable non-transitory recording medium storing an image forming program for controlling an image forming apparatus capable of performing color calibration by using a reference document generated with use of a plurality of inks including CMY inks as a color material, and an external colorimeter. The image forming program causes the image forming apparatus to function as an image reading unit, an image forming unit, and a color calibration processing unit. The image reading unit reads an image on a document and generates image data. The image forming unit forms an image on an image forming medium by using a plurality of toners including CMY toners as a color material. The color calibration processing unit sets a correction coefficient for bringing a color of the reference document and a color of a toner image close to each other by using a spectral reflectance of the reference document in a visible band, and a spectral reflectance in the visible band of the toner image formed on the image forming medium with use of the toner. The color calibration processing unit also performs correction by multiplying the correction coefficient with a gradation value of each of RGB acquired by reading the reference document by the image reading unit, generates a conversion formula from the each acquired gradation value of RGB to each device-independent value by using the each corrected gradation value of RGB, and the each device-independent value acquired by measuring the reference document with use of the external colorimeter, and generates a color profile by using the conversion formula.

BRIEF DESCRIPTION OF THE DRAWINGS

FIGS. 5A, 5B, and 5C are explanatory diagram showing content of RGB calculation processing on a toner reproduction color according to one embodiment;

FIGS. 6A, 6B, 6C, and 6D are explanatory diagrams showing content of RGB calculation processing on an ink reproduction color according to the embodiment.

DETAILED DESCRIPTION

In the following, an embodiment for carrying out the present disclosure (hereinafter, referred to as an "embodiment") is described with reference to the drawings in the following order.

Figure 1:
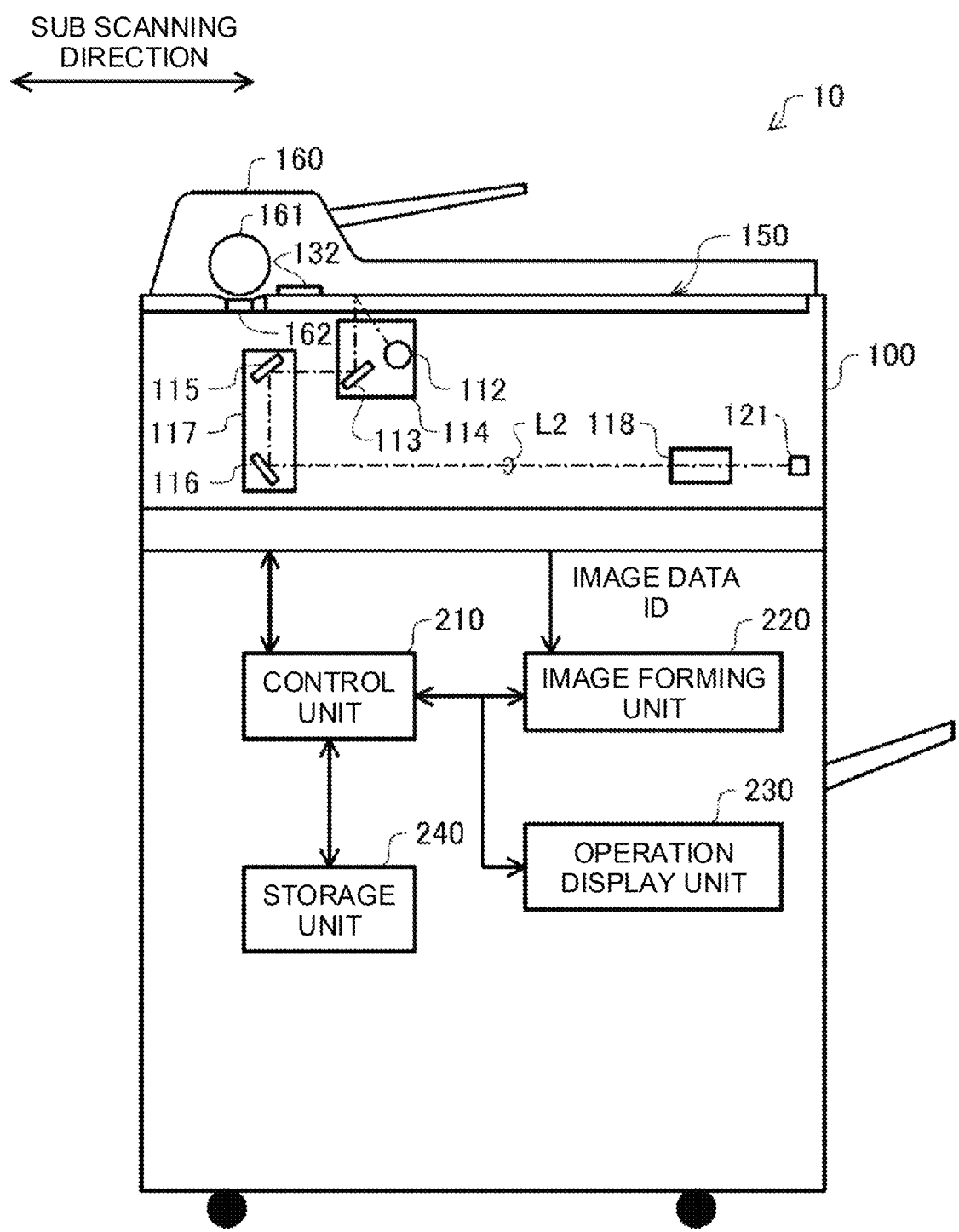
FIG. 1 is a schematic configuration diagram showing an overall configuration of an image forming apparatus 10 according to one embodiment of the present disclosure.
Figure 2:
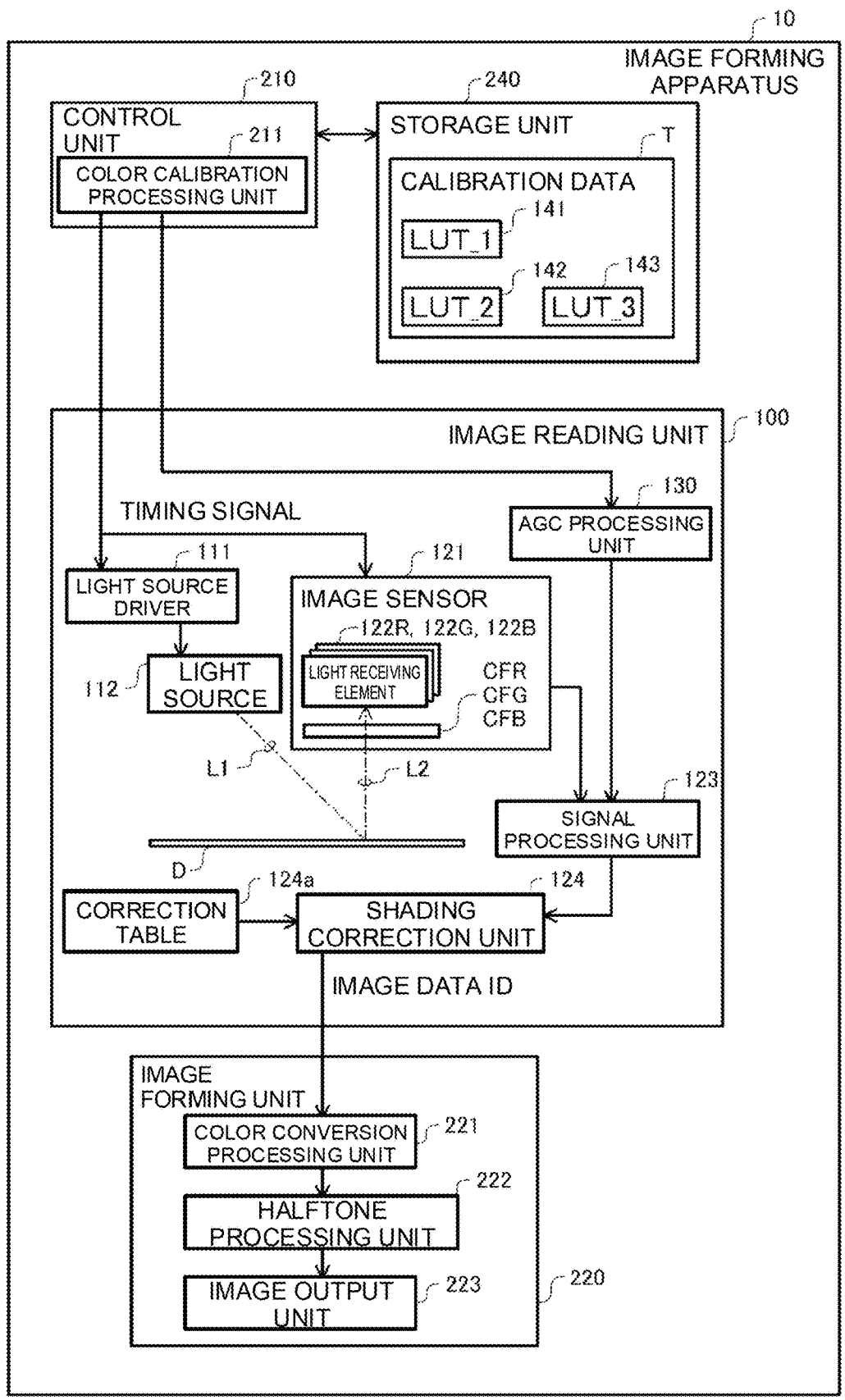
FIG. 2 is a block diagram showing a functional configuration of the image forming apparatus 10 according to one embodiment.

FIG. 1 is a schematic configuration diagram showing an overall configuration of an image forming apparatus 10 according to one embodiment of the present disclosure. FIG. 2 is a block diagram showing a functional configuration of the image forming apparatus 10 according to one embodiment. The image forming apparatus 10 includes an image reading unit 100, a control unit 210, an image forming unit 220, an operation display unit 230, and a storage unit 240. The image reading unit 100 includes an automatic document feeder (ADF) 160 and a document stand (contact glass) 150, and reads an image (original image) from a document and generates image data ID, which are digital data.

The image forming unit 220 forms an image on a printing medium (also referred to as an image forming medium) based on the image data ID, and discharges the printing medium. The image forming unit 220 includes a color conversion processing unit 221, a halftone processing unit 222, and an image output unit 223. The color conversion processing unit 221 color-converts the image data ID, which are RGB data, into CMYK image data. The CMYK image data are color material gradation data having a color material gradation value representing a density of each of a plurality of color materials (for example, CMYK).

The halftone processing unit 222 performs halftone processing and generates halftone data of the CMYK image data. The image output unit 223 forms an image, based on the halftone data. The operation display unit 230 accepts user operation input from a display (not shown) that functions as a touch panel, various buttons, or switches (not shown).

The control unit 210 includes a main storage means such as a RAM and a ROM, and a control means such as an MPU (Micro Processing Unit) and a CPU (Central Processing Unit). The control unit 210 has a controller function associated with an interface such as various I/O, a USB (universal serial bus), a bus, and other hardware components, and controls the entirety of the image forming apparatus 10. The control unit 210 has a color calibration processing unit 211. A function of the color calibration processing unit 211 will be described later.

The storage unit 240 is a storage device including a hard disk drive, a flash memory, and the like, which are non-transitory recording media, and stores a control program (including an image forming program) and data for processing to be performed by the control unit 210.

As shown in FIG. 2, the image reading unit 100 includes a light source driver 111 and a light source 112. The light source 112 has a plurality of LEDs (not shown) for irradiating a document D with light. The light source driver 111 is an LED driver that drives the plurality of LEDs arranged in a main scanning direction, and controls on-off drive of the light source 112. Thus, the light source 112 can irradiate a document surface of the document D with irradiation light L1 with a pulse width modulation (PWM) of a variable drive duty. The light source 112 generally has chromaticity variation.

The irradiation light L1 is emitted at an angle of 45 degrees (in an inclined direction) with respect to a direction perpendicular to the surface of the document D. The document D reflects reflected light including diffused reflected light L2 and specular reflected light. A light receiving element 122 receives the diffused reflected light L2.

As shown in FIG. 1, the image reading unit 100 further includes, between the document D and an image sensor 121, a first reflective mirror 113, a first carriage 114, a second reflective mirror 115, a third reflective mirror 116, a second carriage 117, and a focusing lens 118. The first reflective mirror 113 reflects the diffused reflected light L2 from the document D in a direction toward the second reflective mirror 115. The second reflective mirror 115 reflects the diffused reflected light L2 in a direction toward the third reflective mirror 116. The third reflective mirror 116 reflects the diffused reflected light L2 in a direction toward the focusing lens 118. The focusing lens 118 forms the diffused reflected light L2 on a light receiving surface (not shown) of each of a plurality of the light receiving elements 122 (122R, 122G, 122B) included in the image sensor 121.

The three light receiving elements 122R, 122G, and 122B are three CCD line sensors (not shown) that respectively detect three colors of R, G, and B by using color filters CFR, CFG, and CFB respectively having color components of R, G, and B. The image sensor 121 scans the document (secondary scanning) by the three CCD line sensors extending in the main scanning direction, and acquires an image on the document as combination of voltage values associated with R, G, and B. In this way, the image sensor 121 can perform photoelectric conversion processing, and output analog electrical signals of R, G, and B for each pixel in the main scanning direction. The color filters CFR, CFG, and CFB generally have variations in the layer thickness.

The first carriage 114 carries the light source 112 and the first reflective mirror 113, and reciprocates in a sub scanning direction. The second carriage 117 carries the second reflective mirror 115 and the third reflective mirror 116, and reciprocates in the sub scanning direction. The first carriage 114 and the second carriage 117 are controlled by the control unit 210 that functions as a scanning control unit. This allows the light source 112 to scan the document in the sub scanning direction. Therefore, the image sensor 121 can output an analog electrical signal according to a two-dimensional image on the document.

When the automatic document feeder (ADF) 160 is used, the first carriage 114 and the second carriage 117 are fixed at specific sub scanning positions, and scanning in the sub scanning direction is performed by automatic feeding of the document D. In addition, some ADF160 read not only one side but also both sides at the same time or sequentially.

The ADF160 includes a paper feed roller 161 and a document reading slit 162. The paper feed roller 161 automatically feeds the document, and document reading is performed via the document reading slit 162. In this case, since the first carriage 114 is fixed at the specific sub scanning position, the light source 112 mounted on the first carriage 114 is also fixed at a specific position.

As shown in FIG. 2, the image reading unit 100 further includes a signal processing unit 123, a shading correction unit 124, a shading correction table 124a, an AGC processing unit 130, and a white reference plate 132 (see FIG. 1).

The signal processing unit 123 is a variable gain amplifier having an A/D conversion function. The signal processing unit 123 is set by the AGC processing unit 130, amplifies the analog electrical signal with a gain stored in the storage unit 240, and A/D converts the amplified analog electrical signal into digital data.

In the present embodiment, the AGC processing unit 130 is a gain adjusting unit that sets an optimum gain and an optimum offset value for each of the plurality of light receiving elements 122 by using a black reference signal and a white reference signal. The black reference signal is an analog electrical signal of the light receiving element 122 when the light source 112 is in an off-state. The white reference signal is an analog electrical signal of the light receiving element 122 when the white reference plate 132 is irradiated instead of the document D.

The AGC processing unit 130 sets an offset value in such a way that a gradation value of each of RGB of the image data ID when the black reference signal is A/D converted by the signal processing unit 123 becomes a minimum value "0". The AGC processing unit 130 uses this offset value, and sets a gain in such a way that a gradation value of each of RGB of the image data ID when the white reference signal is A/D converted by the signal processing unit 123 becomes a maximum value "255". This makes it possible to effectively use a dynamic range from the minimum value "0" to the maximum value "255".

The shading correction unit 124 performs shading correction with respect to the digital data, and generates the image data ID. The shading correction is correction for suppressing shading, which may occur due to a light amount non-uniformity of the light source 112 in a length direction, peripheral dimming light by a cosine fourth power law of a lens, and sensitivity unevenness of the plurality of light receiving elements 122 arranged in the main scanning direction. Thus, the image reading unit 100 can generate the image data ID having a gradation value of each of RGB.

The image reading unit 100 has characteristics defined by an input profile. Use of the input profile allows for conversion of the image data ID, which are device-dependent RGB image data, into image data in a device-independent color space, such as Lab image data, which are image data in a Lab color space, or XYZ image data, which are image data in a XYZ color space. Thus, the image forming apparatus 10 can convert data into sRGB image data, for example, via a device-independent Lab color space and the like, and output the data as scan data.

The image forming unit 220 has characteristics defined by an output profile. Use of the output profile allows for conversion of Lab image data and XYZ image data into CMYK image data, which are image data in a CMYK color space. The image forming apparatus 10 has a device link profile in which the input profile and the output profile are combined. The device link profile can reduce the load of color conversion processing in copying processing, and improve a printing speed.

The input profile, the output profile, and the device link profile are each configured as a look-up table (LUT: LUT_1, LUT_2, LUT_3) 141 to 143. The look-up tables (LUT) 141 to 143 are stored in the storage unit 240. The look-up tables (LUT) 141 to 143 are configured by the following method, and suppress individual differences in color reproduction in the image forming apparatus 10.

Figure 3:
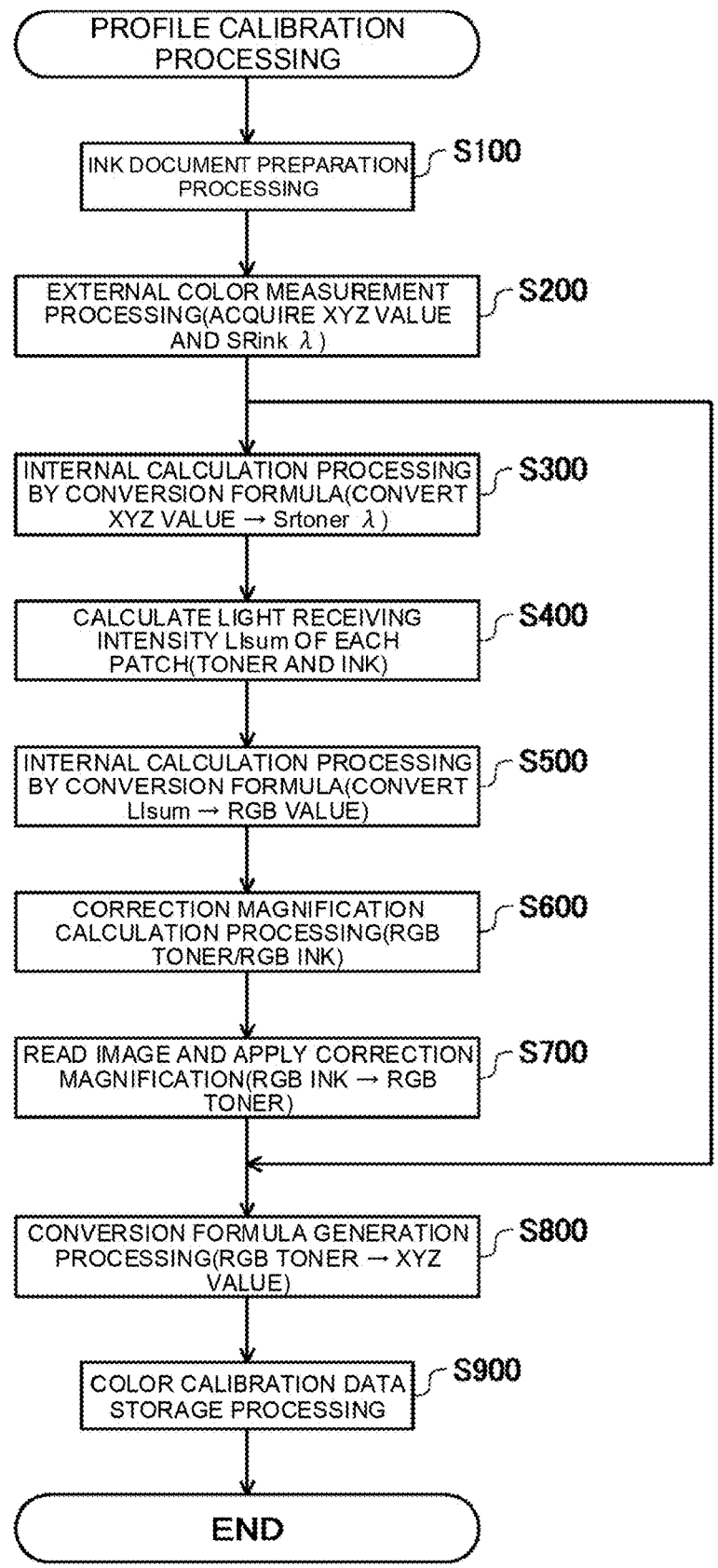
FIG. 3 is a flowchart showing a content of profile calibration processing according to one embodiment.

FIG. 3 is a flowchart showing content of profile calibration processing according to one embodiment. The profile calibration processing can calibrate the input profile, the output profile, and the device link profile. The input profile, the output profile, and the device link are also referred to as a color profile.

In Step S100, a person in charge of manufacturing (adjustment) or a service person prepares an INK document printed by offset printing with use of ink as a color material. This is because, unlike electrophotography processing, printed matter by offset printing has small in-plane variation and high wear resistance. Since this also allows for use in adjusting a plurality of image forming apparatus 10, it is also possible to provide an advantageous effect in reducing the number of steps. As long as an INK document is the one using color ink as a color material, the INK document may be the one generated by a printing method other than offset printing.

Figures 4A, 4B:
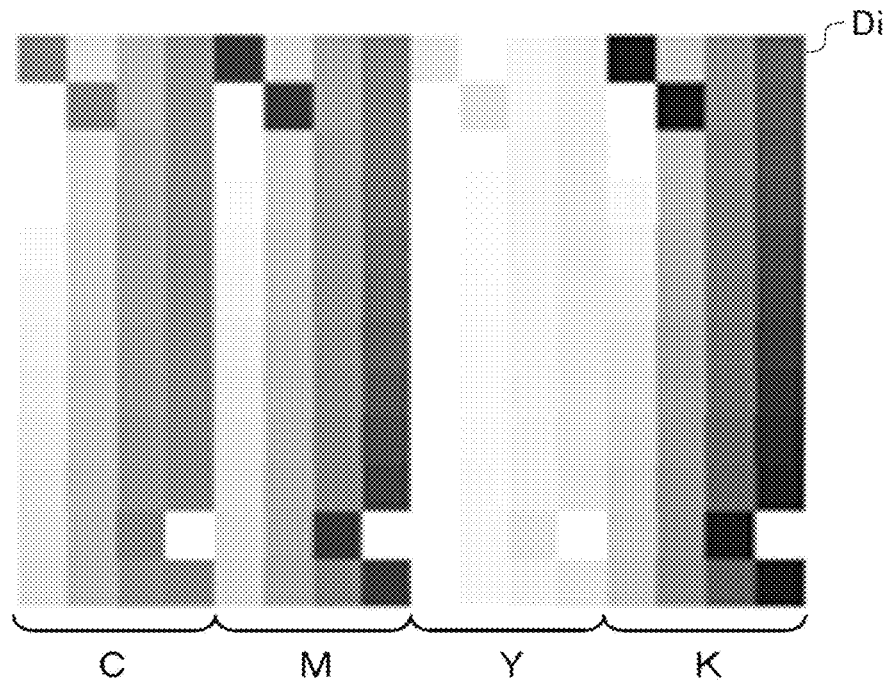
FIGS. 4A and 4B are explanatory diagrams showing content of external color measurement processing according to one embodiment.

FIGS. 4A and 4B are explanatory diagrams showing content of external color measurement processing according to one embodiment. FIG. 4A shows one example of an INK document Di. The INK document Di is reproduced by offsetting printing a chart including patches of 48 gradations of each color material of CMYK. The INK document Di is also referred to as a reference document.

In Step S200, the person in charge of manufacturing (adjustment) or the service person performs the external color measurement processing. In the external color measurement processing, the person in charge of manufacturing (adjustment) or the service person measures an XYZ value and an ink spectral reflectance SRink$\lambda$ in a wavelength range of 400 nm to 730 nm with use of an external colorimeter (not shown) of the image forming apparatus 10. The XYZ value and the ink spectral reflectance SRink$\lambda$ are measured for each patch of CMYK.

In Step S300, the color calibration processing unit 211 of the control unit 210 calculates a toner spectral reflectance SRtoner$\lambda$ from the XYZ value by using a second-order approximate conversion formula F1 (see FIG. 4B) stored in the storage unit 240 in advance. The toner spectral reflectance SRtoner$\lambda$ is a spectral reflectance at each wavelength $\lambda$nm for reproducing the XYZ value measured on the INK document Di. The toner spectral reflectance SRtoner$\lambda$ is measured for each patch of CMYK. The order of the approximate conversion formula F1 is not limited to the second order, but may be the second order or higher.

In Step S400, the color calibration processing unit 211 calculates a cumulative value of a light receiving intensity (or a light receiving amount) in a visible band of reflected light of toner received by the three light receiving elements 122R, 122G, 122B, respectively, with use of calculation formulas F2$r$, F2$g$, F2$b$ and calculation formulas F3$r$, F3$g$, F3$b$.

FIGS. 5A, 5B, and 5C are explanatory diagrams showing content of RGB calculation processing on a toner reproduction color according to one embodiment. FIG. 5A shows the calculation formulas F2$r$, F2$g$, and F2$b$ used for light receiving intensity calculation processing for each wavelength. RLItoner$\lambda$ in the calculation formula F2$r$ is a light receiving intensity for each wavelength of R. SRtoner$\lambda$ is a toner spectral reflectance thereof. STr$\lambda$ is a spectral transmittance of the color filter CFR representing R at the wavelength $\lambda$nm. GLItoner$\lambda$ in the calculation formula F2$g$ is a light receiving intensity for each wavelength of G.

SRtonerλ is a toner spectral reflectance thereof. STgλ is a spectral transmittance of the color filter CFG representing G at the wavelength λnm. BLItonerλ in the calculation formula F2b is a light receiving intensity for each wavelength of B. SRtonerλ is a toner spectral reflectance thereof. STbλ is a spectral transmittance of the color filter CFB representing B at the wavelength λnm.

FIG. 5B shows the calculation formulas F3r, F3g, and F3b used for light receiving intensity calculation processing in the visible band. RLItoner_sum in the calculation formula F3r is a cumulative value of RLItonerλ in the visible band (for example, wavelength of 400 nm to 730 nm). GLItoner_sum in the calculation formula F3g is a cumulative value of GLItonerλ in the visible band (wavelength of 400 nm to 730 nm). BLItoner_sum in the calculation formula F3b is a cumulative value of BLItonerλ in the visible band (wavelength of 400 nm to 730 nm).

Specifically, RLItoner_sum is a cumulative value of a light receiving intensity in the visible band received by the light receiving element 122R. GLItoner_sum is a cumulative value of a light receiving intensity in the visible band received by the light receiving element 122G. BLItoner_sum is a cumulative value of a light receiving intensity in the visible band received by the light receiving element 122B.

In Step S400, the color calibration processing unit 211 further calculates a cumulative value of a light receiving intensity in the visible band of reflected light of ink received by the three light receiving elements 122R, 122G, 122B, respectively, with use of calculation formulas F5r, F5g, F5b and calculation formulas F6r, F6g, F6b.

FIGS. 6A, 6B, and 6C are explanatory diagrams showing content of RGB calculation processing on an ink reproduction color according to one embodiment. FIG. 6A shows the calculation formulas F5r, F5g, and F5b used for light receiving intensity calculation processing for each wavelength. RLIinkλ in the calculation formula F5r is a light receiving intensity for each wavelength of R. SRinkλ is an ink spectral reflectance thereof. STrλ is a spectral transmission of the color filter CFR representing R at the wavelength λnm. GLIinkλ in the calculation formula F5g is a light receiving intensity for each wavelength of G. SRinkλ is an ink spectral reflectance thereof. STgλ is a spectral transmittance of the color filter CFG representing G at the wavelength λnm. BLIinkλ in the calculation formula F5b is a light receiving intensity for each wavelength of B. SRinkλ is an ink spectral reflectance thereof. STbλ is a spectral transmittance of the color filter CFB representing B at the wavelength λnm.

FIG. 6B shows the formulas F6r, F6g, and F6b used for light receiving intensity calculating processing in the visible band. RLIink_sum in the calculation formula F6r is a cumulative value of RLIinkλ in the visible band (for example, wavelength of 400 nm to 730 nm). GLIink_sum in the calculation formula F6g is a cumulative value of GLIinkλ in the visible band (wavelength of 400 nm to 730 nm). BLIink_sum in the calculation formula F6b is a cumulative value of BLIinkλ in the visible band (wavelength of 400 nm to 730 nm).

Specifically, RLIink_sum is a cumulative value of a light receiving intensity in the visible band received by the light receiving element 122R. GLIink_sum is a cumulative value of a light receiving intensity in the visible band received by the light receiving element 122G. BLIink_sum is a cumulative value of a light receiving intensity in the visible band received by the light receiving element 122B.

Figure 7A:
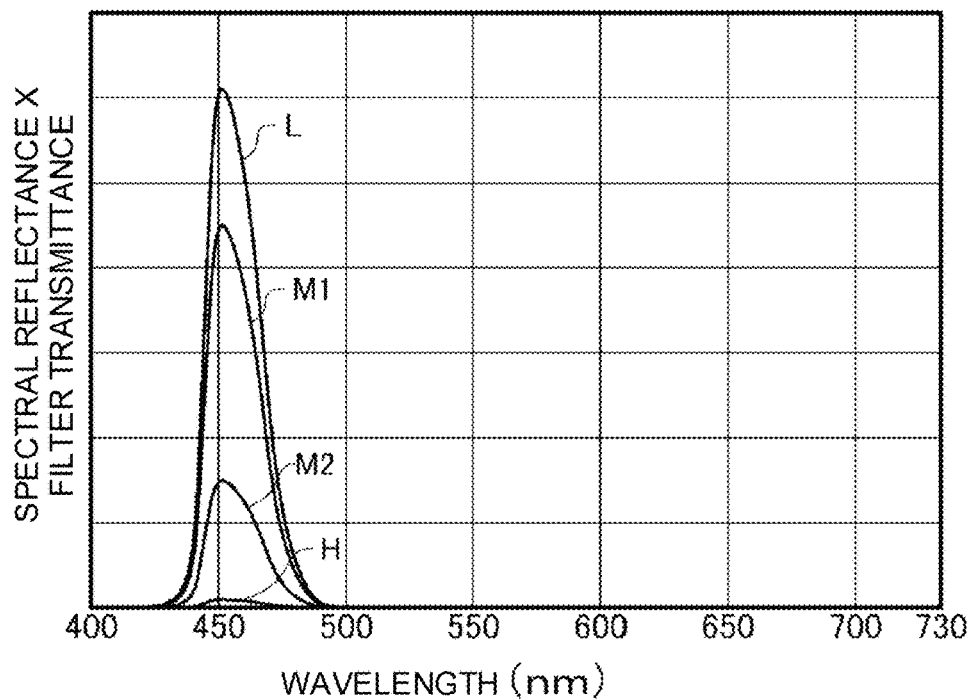
FIGS. 7A and 7B are graphs showing products of spectral reflectance and filter transmittance in a visible band according to one embodiment.
Figure 7B:
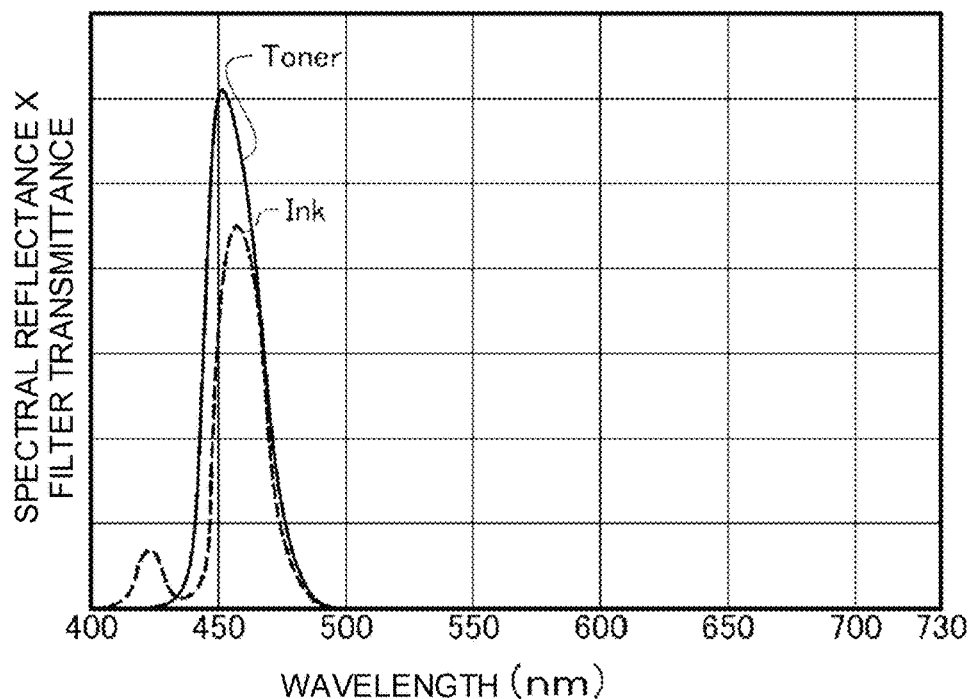

FIGS. 7A and 7B are graphs showing products of spectral reflectance and filter transmittance in a visible band according to one embodiment. FIG. 7A shows a product of a spectral reflectance and a filter transmittance (color filter CFB) at a density level 4 of yellow toner in the visible band. The yellow toner is toner that absorbs the color of B and reproduces the color of yellow. In the present embodiment, all the three light receiving elements 122R, 122G, and 122B output a voltage according to a light receiving intensity in a band of visible light, and have almost the same characteristics.

A first curve L shows a product of a spectral reflectance and a filter transmittance of a background color of printing paper on which yellow toner is not formed. A second curve M1 shows a product of a spectral reflectance and a filter transmittance of a background color of printing paper on which yellow toner is applied relatively lightly. A third curve M2 shows a product of a spectral reflectance and a filter transmittance of a background color of printing paper on which yellow toner is relatively heavily applied. A fourth curve H shows a product of a spectral reflectance and a filter transmittance of a background color of printing paper on which solid yellow toner is formed.

In this way, the three light receiving elements 122R, 122G, and 122B output a voltage according to a light receiving intensity in a band of visible light with almost the same characteristics, and detect the voltage as RGB light according to the transmittance characteristics of the color filters CFR, CFG, and CFB, respectively. Therefore, RGB gradation values have a relatively positive correlation with an integrated value (or a cumulative value) of a product of a spectral reflectance and a spectral transmittance at a wavelength in the band of visible light or in a band that is set in advance to have a characteristic of each of RGB.

In Step S500, the color calibration processing unit 211 calculates RGB gradation values R_toner, G_toner, and B_toner from RLItoner_sum, GLItoner_sum, and BLItoner_sum, respectively, by using approximate conversion formulas F4r, F4g, and F4b stored in the storage unit 240 in advance.

In Step S500, the color calibration processing unit 211 further calculates RGB gradation values R_ink, G_ink, and B_ink from RLIink_sum, GLIink_sum, and BLIink_sum, respectively, by using approximate conversion formulas F7r, F7g, and F7b stored in the storage unit 240 in advance.

FIG. 7B is an explanatory diagram showing a content of RGB calculation processing on the ink reproduction color according to one embodiment. FIG. 7(b) is a graph showing spectral reflectances of toner and ink in comparison. The discloser of the present application confirmed by simulation and experiments that a ratio of a spectral reflectance between toner and ink was substantially constant.

In Step S600, the color calibration processing unit 211 performs correction magnification calculation processing. In the correction magnification calculation processing, the color calibration processing unit 211 calculates correction magnifications yr, yg, and yb of RGB (see FIG. 6D) by using calculation formulas F8r, F8g, and F8b. The correction magnification is also referred to as a correction coefficient.

In Step S700, the image reading unit 100 reads an image of the INK document Di (see FIG. 4A), and multiplies each of the acquired RGB gradation values by each of the correction magnifications yr, yg, and yb of RGB. Thus, the image reading unit 100 can acquire an RGB value equivalent to toner output paper when toner is used as a color material instead of ink.

In Step S800, the color calibration processing unit 211 performs conversion formula generation processing. In the conversion formula generation processing, the color calibration processing unit 211 generates an approximate conversion formula from an RGB value equivalent to toner output paper to an XYZ value by using the XYZ value acquired in Step S200 and the RGB value equivalent to the toner output paper. In the present specification, the approximate conversion formula has a broad meaning, and includes an approximate formula and a table.

In Step S900, the color calibration processing unit 211 updates the input profile, the output profile, and the device link profile by using the approximate conversion formula, and stores them in the storage unit 240.

As described above, the image forming apparatus 10 according to one embodiment is configured to be able to perform color calibration by using a reference document generated with use of a plurality of inks including CMY inks as a color material, and an external colorimeter. Thus, the image forming apparatus 10 can suppress individual differences in color reproduction of the image forming apparatus with a simple configuration.

Modifications: The present disclosure can also be implemented not only in the above embodiment but also in the following modifications.

Modification 1: In the above embodiment, a correction magnification is determined by using a ratio between a cumulative value of a spectral reflectance of a reference document in a visible band, and a cumulative value of a spectral reflectance of a toner image in the visible band. For example, the ratio may be determined by using a specific cumulative value within each band of RGB.

Modification 2: In the above embodiment, a correction magnification is set for each color of RGB. Alternatively, the correction magnification may be set for each patch, and a gradation between the patches may be set by internal interpolation. The present disclosure can be applied, even when the ratio of a spectral reflectance between toner and ink is non-linear.

What is claimed is:

1. An image forming apparatus configured to perform color calibration by using a reference document generated with use of a plurality of inks including CMY inks as a first color material, and an external colorimeter, and form an image on an image forming medium by using a plurality of toners including CMY toners as a second color material, comprising:
   an image sensor that reads an image on a document and generates image data; and
   a controller that sets a correction coefficient for bringing a color of the reference document and a color of a toner image close to each other by using a first spectral reflectance of the reference document in a visible band and a second spectral reflectance in the visible band of the toner image formed on the image forming medium with use of the toner, performs correction by multiplying the correction coefficient with a gradation value of each of RGB acquired by reading the reference document by the image sensor, generates a conversion formula from the each acquired gradation value of RGB to each device-independent value by using the each corrected gradation value of RGB, and the each device-independent value acquired by measuring the reference document with use of the external colorimeter, and generates a color profile by using the conversion formula.

2. The image forming apparatus according to claim 1, wherein
   the controller determines the correction coefficient by using a ratio between a cumulative value of the first spectral reflectance of the reference document in a visible band, and a cumulative value of the second spectral reflectance of the toner image in the visible band.

3. The image forming apparatus according to claim 1, wherein
   the controller calculates a third spectral reflectance for reproducing a device-independent value in terms of the toner image by calculating the device-independent value acquired by using the external colorimeter with use of a specific second-order or higher approximate conversion formula.

4. The image forming apparatus according to claim 1, wherein
   the reference document is generated by offset printing with use of ink as the first color material.

5. An image forming method capable of performing color calibration by using a reference document generated with use of a plurality of inks including CMY inks as a first color material, and a colorimeter outside an image forming apparatus, comprising:
   reading an image on a document and generating image data;
   forming an image on an image forming medium by using a plurality of toners including CMY toners as a second color material; and
   setting a correction coefficient for bringing a color of the reference document and a color of a toner image close to each other by using a first spectral reflectance of the reference document in a visible band, and a second spectral reflectance in the visible band of the toner image formed on the image forming medium with use of the toner, performing correction by multiplying the correction coefficient with a gradation value of each of RGB acquired by reading the reference document in the image reading step, generating a conversion formula from the each acquired gradation value of RGB to each device-independent value with use of the each corrected gradation value of RGB, and the each device-independent value acquired by measuring the reference document with use of the external colorimeter, and generating a color profile by using the conversion formula.

6. A computer-readable non-transitory recording medium storing an image forming program for controlling an image forming apparatus capable of performing color calibration by using a reference document generated with use of a plurality of inks including CMY inks as a first color material, and an external colorimeter, the image forming program causing the image forming apparatus to execute:
   reading an image on a document and generates image data;
   forming an image on an image forming medium by using a plurality of toners including CMY toners as a second color material; and
   setting a correction coefficient for bringing a color of the reference document and a color of a toner image close to each other by using a first spectral reflectance of the reference document in a visible band, and a second spectral reflectance in the visible band of the toner image formed on the image forming medium with use of the toner, performing correction by multiplying the correction coefficient with a gradation value of each of RGB acquired by reading the reference document, generating a conversion formula from the each acquired gradation value of RGB to each device-independent value by using the each corrected gradation value of RGB, and the each device-independent value acquired by measuring the reference document with use of the external colorimeter, and generating a color profile by using the conversion formula.

* * * * *